J. B. PERRY.
UNDERCUTTING SAW SUPPORT.
APPLICATION FILED JUNE 7, 1911.
1,016,090.
Patented Jan. 30, 1912.
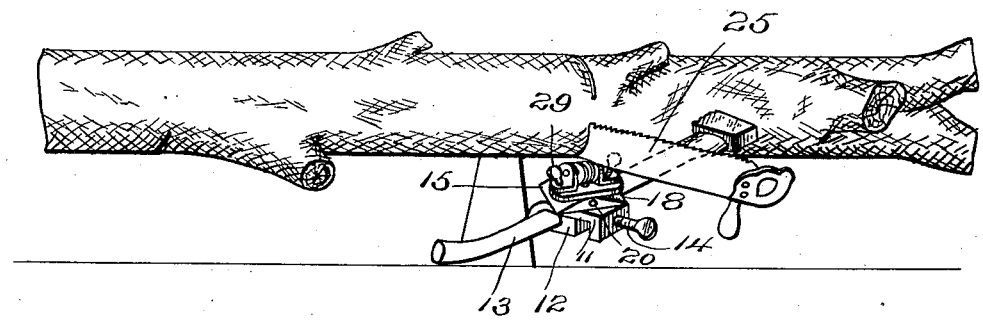
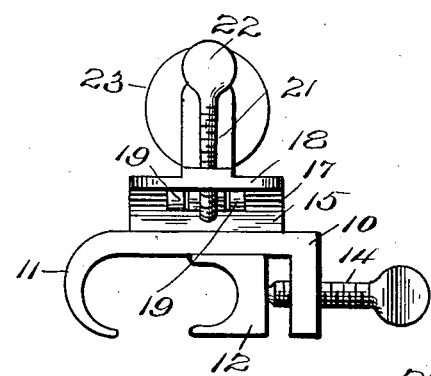
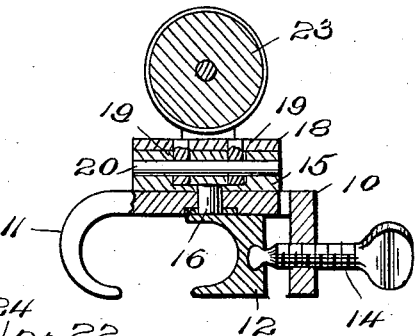
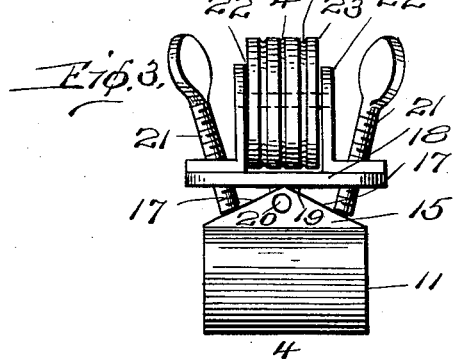
Witnesses
Inventor
John B. Perry,
By
Attorneys

UNITED STATES PATENT OFFICE.

JOHN B. PERRY, OF MEADOWDALE, WASHINGTON.

UNDERCUTTING-SAW SUPPORT.

1,016,090.  Specification of Letters Patent.  Patented Jan. 30, 1912.

Application filed June 7, 1911. Serial No. 631,793.

*To all whom it may concern:*

Be it known that I, JOHN B. PERRY, a citizen of the United States, residing at Meadowdale, in the county of Snohomish and State of Washington, have invented certain new and useful Improvements in Undercutting-Saw Supports; and I do hereby declare the following to be a full, clear, and exact description of the invention, such as will enable others skilled in the art to which it appertains to make and use the same.

This invention relates to saw supports for under cutting and has for an object to provide a device attachable to an ax handle and which will support a saw while being moved upwardly in cutting.

A further object of the invention is to provide a saw supporting device attachable to an ax handle and adjustable to a variety of positions and presenting a roller for engaging the back of a saw and supporting the same.

With these and other objects in view the invention comprises certain novel constructions, combinations and arrangement of parts as will be hereinafter more fully described and claimed.

In the drawings:—Figure 1 is a view of the improved saw supporting device shown in operative position. Fig. 2 is a view of the device in end elevation. Fig. 3 is a view of the device in side elevation. Fig. 4 is a vertical sectional view taken on line 4—4 of Fig. 3.

Like characters of reference indicate corresponding parts throughout the several views.

In the under cutting of logs and the like it is necessary to provide means for supporting the saw as it is being used. The present invention provides a frame 10 having a hook 11 and a movable member 12 providing space therebetween to receive an ax handle as 13 and a screw 14 for clamping the movable member 12 upon such handle. Upon the frame 10 a turn table member 15 is mounted by being pivoted centrally as by the pintle 16 so that said turn table member may rotate upon the frame 10. The turn table member 15 is provided upon opposite sides with inclined portions 17 whereby the said member is provided at the center with an apex which serves as a fulcrum for the mounting of the tilting member 18. The tilting member 18 is secured upon the turn table member by means of a plurality of ears 19 which are carried by said tiltable member and fulcrumed upon a pin 29 inserted through the turn table member adjacent the apex. The pin also extends through the pintle member 16 and retains the same in position.

To provide for tilting the tiltable member screws 21 are provided extending through the said tiltable member and into engagement with the inclined surfaces 17. The tiltable member is also provided with upstanding ears 22 between which is journaled a roller 23 provided with a plurality of grooves 24 in which the saw 25 may be carried.

When starting the cut in the under side of a log an ax is driven into the log with the handle 13 disposed downwardly at an inclination. The device is then attached to the handle, as indicated at Fig. 1, and the turn table rotated so that the axis of the roller 23 is substantially parallel with the axis of the log. This is accomplished not only by rotating the turn table member but by tilting the tiltable member until such parallelism is accomplished. The saw is then inserted to be carried in one of the grooves 24 and the cutting commenced. As the cutting progresses and it is necessary to raise the saw, the ax is withdrawn from the log and again driven in at a different angle or a different position to provide a change of position for the support.

I claim:—

In an undercutting saw support, a frame, means to clamp the frame upon an ax handle, a turn table mounted to rotate upon the frame and provided with an elongated pivot, a tiltable member mounted to swing upon the pivot, screws carried one upon either side of the tiltable member and adapted to control the inclination of such tiltable member, and a roller journaled upon the tiltable member.

In testimony whereof I affix my signature in presence of two witnesses.

JOHN B. PERRY.

Witnesses:
G. WARD KEMP,
C. C. PHILLIPS.

Copies of this patent may be obtained for five cents each, by addressing the "Commissioner of Patents, Washington, D. C."